United States Patent Office 3,745,208
Patented July 10, 1973

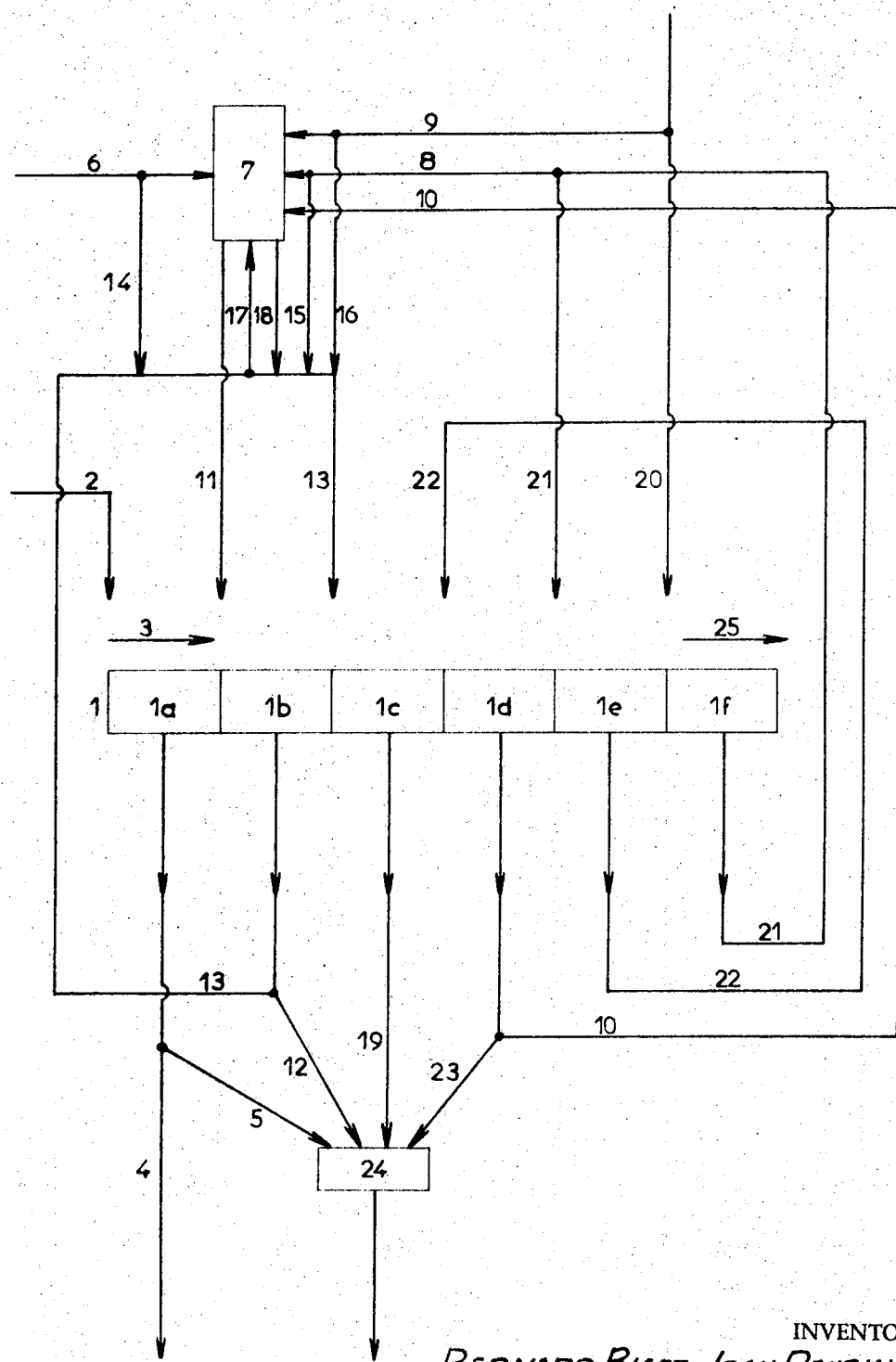

3,745,208
WET PROCESS MANUFACTURE OF PHOSPHORIC ACID AND CALCIUM SULPHATE
Bernard Bigot, Rouen, and Jean Roubinet, Grand-Quevilly, France, assignors to Pechiney-Saint Gobain, Neuilly-sur-Seine, France
Filed Oct. 2, 1970, Ser. No. 77,616
Int. Cl. C01f 1/00; C01b 25/16
U.S. Cl. 423—166
14 Claims

ABSTRACT OF THE DISCLOSURE

A process for the preparation of phosphoric acid and calcium sulphate substantially free of syncrystallized phosphate in which the calcium phosphate is solubilized with sulphuric acid or a mixture of sulphuric acid and phosphoric acid, separating the calcium sulphate from the phosphoric acid and treating the calcium sulphate in the separation device with a treating solution in the form of an aqueous solution containing sulphuric acid for modification of the state of hydration, and then separating and washing the modified calcium sulphate.

This invention relates to the wet process manufacture of phosphoric acid by attack of calcium phosphate with sulphuric acid and precipitation of calcium sulphate in several successive different crystalline forms, for the purpose of improving the recovery rate of $P_2O_5$ of the phosphate.

It is known that in the manufacture of phosphoric acid by sulphuric acid attack, the total yield results from the amount of calcium phosphate extracted by the acid, from the extraction yield of crystallized $P_2O_5$ in the form of di-calcium phosphate simultaneously with the dihydrated calcium sulphate, generally called "syn-crystallized," and also from the yields of filtration and washing of the obtained solid.

It is known that even when very good yields from the attack, filtration and washing are obtained, the total yield is nevertheless still limited by the formation of syncrystallized $P_2O_5$.

It is also known that the syncrystallized $P_2O_5$ is released when calcium phosphate is converted into a crystalline form having a different hydration state.

Theoretically calcium sulphate dihydrate or gypsum, crystallized in the monoclinic system, can be converted into triclinic hemihydrate or into rhombohedral anhydrite hemihydrate, either into dihydrate or into anhydrite, anhydrite into hemihydrate or into gypsum, in the latter case, by treating the unstable form of anhydrite. These various conversions are achieved only under very definite physico-chemical conditions which do not permit reformation of dicalcium phosphate. This can best be avoided by operating in a medium wherein the concentration of $SO_4$ ions is high.

The French Pat. No. 1,344,871 describes an industrial process of attack on the phosphate under conditions leading to the hemihydrate and recrystallizing this hemihydrate into gypsum by hydration within the reaction medium. Such recrystallizations are very slow in processes of this type, thus compelling the use of reactors of large volume.

It has also been proposed, more particularly in the French Pat. 1,491,767, to produce the hemihydrate by attacking and filtering the strong acid which constitutes the end-product.

Filtration and particularly washing of the unstable hemihydrate presents many problems which must be overcome. In order to avoid cloggings and clumpings, one must endeavor to preserve the crystalline form on the filter by a series of careful washings by a first solution of a composition and at a temperature that the form of unstable hemihydrate is preserved, resuspending the solid in a reactor, and conveying into another reactor in which one brings about the change of the crystalline form by a second solution. There is still needed a second filtration and a second series of washings.

In another attempt it has been also proposed, in accordance with the teachings of the French Pat. No. 1,485,940 to cause the formation of gypsum during the attack and to convert it afterwards to the hemihydrate. This conversion is achieved by adding to the reaction slurry a dehydrating and warm liquid containing an excess of sulphuric acid while strongly stirring and heating; the excess sulphuric acid finds its way into the output phosphoric acid as also a part of the mother liquor of the gypsum, so that such an acid is unsuitable for most applications. Therefore, in an alternate method, it has been proposed to separate the greater part of the outflowing phosphoric acid from the attack slurry in gypsum and to treat a thickened slurry in the same means as before.

In all cases, one manages to combine all conditions required in order to obtain a valid extraction of $P_2O_5$ from the phosphate, and a satisfactory concentration and purity of phosphoric acid in a process comprising two successive crystallizations of calcium sulphate, only with an apparatus comprising at least two reaction zones and two separation zones.

It is an object of this invention to provide a new and improved process for the manufacture of phosphoric acid and calcium sulphate which is free of the process conditions heretofore described.

It has been found that it was possible to achieve a change of hydration state of the calcium sulphate with an apparatus comprising only a reaction zone and a separation zone.

In accordance with the practice of this invention, calcium phosphate is solubilized in an attack zone by sulphuric acid or a mixture of sulphuric and phosphoric acids, the produced phosphoric acid is separated from the solid calcium sulphate by means of an appropriate separation device, the calcium sulphate is brought in contact in the separation device with a treating solution which causes a change of the hydration state, and the calcium sulphate, having a different state of hydration, is separated and washed. The treating solution, generally aqueous, contains sulphuric acid.

Preferably the process is carried out as a continuous operation and the treating solution contains sulphuric acid provided in part by the sulphuric acid required for the attack and recycled phosphoric acid of one of the methodic washing stages of calcium sulphate after its conversion. The treatment solution and also the liquids of methodic washing are recycled to the attack zone.

Temperatures, contact times and also the respective concentrations of phosphoric acid and sulphuric acid, of the treatment solution are selected according to the change of the hydration state which is to be obtained. Generally the temperature of the treating solution is selected to be within the range of 20° C. and the boiling temperature. The contact times decreases as the temperature and concentrations are increased.

In order to achieve the conversion of the hemihydrate into gypsum or of the unstable anhydrite into hemihydrate and/or into gypsum, there is advantageously used a treating solution containing from 5% to 25% sulphuric acid and from 0% to 20% phosphoric acid expressed in the form of $P_2O_5$ at a temperature between 20° C. and 100° C., and preferably about 70° C.

Likewise the conversion of hemihydrate and/or of dihydrate into anhydrite is advantageously achieved by using an aqueous solution containing 98% to 50% of $H_2SO_4$ and 0% to 35% $P_2O_5$ at a temperature within the range of 20° C. to the boiling temperature, and preferably about 80° C.

The conversion of gypsum into hemihydrate is still more preferably achieved by using an aqueous solution containing from 80% to 25% of $H_2SO_4$ and from 0% to 30% $P_2O_5$ at a temperature between 20° C. and 100° C., preferably 60° to 70° C.

The contacting method of the treating solution with the calcium sulphate may vary according to the modification of the hydration state which is desired to be achieved.

According to a first alternative embodiment of the process of this invention, the conversion of hemihydrate into gypsum is achieved by contacting with a treatment solution of the hemihydrate resulting from the attack stage, said hemihydrate being present in a separation device. Preferably use is made of a separation device in which the material can be washed such as a decanter or a centrifugal drier, and preferably a hydroextractor which may or may not have mixing means such as an incorporated screw.

According to another alternative embodiment of the process of this invention, the conversion of hemihydrate into anhydrite or still the conversion of gypsum into hemihydrate and/or into anhydrite by contacting with a treatment solution is carried out in a separation device able to be washed which may be a device for filtration, decantation, or centrifugal drying.

According to an alternative embodiment which represents a particularly advantageous method of carrying out of the process of this invention, the conversion of gypsum into hemihydrate is carried out on a horizontal filter, more particularly a continuous vacuum filter in which multiple washings may be employed.

In all cases, the treatment solution drawn back to the attack zone, after contacting, during the hydration state modification of the calcium sulphate, and which contains solubilized phosphoric acid, rejoins in the attack zone, the phosphoric acid solubilized during this attack.

Afterwards, the solid is undergone to the usual methodic washings.

It will be noticed that the hydration state modification is fast; generally it is achieved during the time required for passage of the treatment solution through the solid.

It is possible to pass the treatment solution several times through the solid, in this case its temperature can be adjusted as well as its concentration at each passage, as by supplying sulphuric acid in the case of a dehydrating conversion, or water in the case of a hydrating conversion.

The contact time is regulated according to the requirements. The contact can be extended by decreasing or by temporarily eliminating the vacuum in the vacuum filter. Furthermore, it is possible to modify the converion speed and the quality of the filtration by introducing into the slurry fed to the separation device a small amount of calcium sulphate crystals having the hydration degree which is desired to be obtained. These crystals generally in an amount less than 10% by weight of the solids in the slurry, can be obtained from the already treated calcium sulphate or separately prepared.

Furthermore, when the calcium sulphate is treated in the form of a filter "cake" on a flat and horizontal filter, the modification of the hydration state is achieved without substantially degrading the quality of the filtration which depends somewhat on the structure and on the porosity of the cake.

In spite of a less beneficial crystallization, particularly in the case of the calcium sulphate dehydration, the cake maintains a good porosity. In this case, there is observed only a partial settling, which occurs progressively during the methodic washings.

Another advantage afforded by the process in the gypsum dehydration into hemihydrate, in accordance with a preferred practice of this invention, is that an acid can be obtained which is more concentrated in $P_2O_5$ than in the standard dihydrate process. Effectively, it is known that in the preparation of concentrated acid, the quality of the gypsum crystals becomes mediocre when the acid concentration increases and that the separation and washing of such crystals are difficult for a highly concentrated acid. In such instance, the process of this invention applies to the treatment of a rather voluminous cake which is dehydrated and becomes suitable for the separation and the washing. Besides, in the case of the manufacture of phosphoric acid by attack of phosphate under the conditions of the formation of hemihydrate, the application of the process of this invention permits an acid having a concentration above 50% to be directly produced.

Moreover, whatever may be the selected conversion, the washing of the solid is achieved with a minimum of loss. The losses by washing in the standard processes are composed of phosphoric acid entrained with the crystals and are only recoverable by a methodic washing with water. In this case, the sulphuric acid of the treatment solution participates in the entrainment of the phosphoric acid. Moreover, in the case where the process of this invention achieves a dehydrating modification, and more particularly according to a preferred method when the dehydration of gypsum is achieved on a filter, the water of crystallization itself is released and facilitates the entrainment of the phosphoric acid. It is still possible not to dehydrate the whole cake. Effectively, it has been noticed that allowing a thin layer of dihydrate to remain enables the formation of a stable filtering bed which avoids incrustations on the filter gauze and in the circuits of the filter. The control of this layer is obtained by regulating the flow, the temperature and the concentrations of the treatment solutions. Consequently, in this respect, the process of this invention affords an advantageous control of the fraction of the solid which can be treated.

The process of this invention can be employed in any standard apparatus for the manufacture of phosphoric acid comprising a reaction zone for the attack of phosphates and separation zone of the solid. The digesting zone advantageously can be a separate single vat. The separation of the solid can be achieved by any known means, more particularly by a decanter, a centrifugal drier, a filter of any type, and preferably a continuous vacuum filter.

The appended flow diagram is given by way of illustration and not by way of limitation of a method of embodiment of the process of this invention.

In this diagram, 1 represents the evolute of the vacuum box of the vacuum continuous filter. The box is divided into sectors 1a, 1b, 1c, 1d, 1e, 1f intended to collect the various filtrates. Each of these filtrates is circulated, as by pumps which are not represented. The slurry, coming from the attack reactor, is delivered through 2 onto the filter and the formed calcium sulphate cake 3 is carried along from the left to the right. The strong phosphoric acid drains from 1a and the portion corresponding to the production is sent to the storage tank through the pipe 4 and the excess is recycled to the attack vat through conduit 5. The sulphuric acid is fed through 6 into a mixing pot 7 where it can be diluted by very weak acid coming from the filter 1f through line 8, by water fed through 9, by average grade acid coming through 10, or by a mixture of these liquids and preferably by the very weak acid through line 8. The amount and the concentration of the treatment solution are regulated by the respective amounts of these various fluids. The temperature of mixer 7 is regulated by well known means, preferably the excess of calories, released from the dilution of the concentrated sulphuric acid, is eliminated by evaporation. The treatment solution flows through line 11 onto the calcium sulphate cake. Of the resulting filtrate, collected in 1b, part is sent to the digesting vat through the conduit 12 and part is cycled to the filter through the conduit 13. Sulphuric acid can be added to this filtrate through the conduit 14, very weak phosphoric acid through the conduit 15, and water through the conduit 16. The conduits 17 and 18 permit the flow of the liquid brought into 13 with the initial treating solution prepared in 7. The filtrate, collected in the sector 1c, is recycled to the attack zone through 19. Water is introduced through the conduit 20 and the filtrate composed of very weak acid collected in the sector 1f is brought to a previous stage of washing of the cake through the conduit 21, a part of this filtrate may be drawn off through 8 for the dilution of the treatment solution. The filtrate resulting from the washing with the very weak acid is collected in 1e, it is still a weak acid and is returned to a previous stage of washing through the conduit 22. The filtrate collected in 1d, called average grade acid, is transmitted to the mixing pot 24 through the conduit 23 where it rejoins the various effluents which are recycled to the digesting vat. A part of the average grade acid can be recycled to the mixing pot 7 through the conduit 10. At the end of operation, the treated and washed calcium sulphate is removed, as represented by the arrow 25.

By the practice of this invention, there is obtained a $P_2O_5$ concentrated phosphoric acid, without a substantial proportion of sulphuric acid. One obtains a yield which generally is of the order of 99% and often above 99%. The calcium sulphate obtained as by-product is relatively pure, its $P_2O_5$ content is almost always below 0.2%. Furthermore, the process of this invention permits selection of the most desirable crystalline form, either gypsum, hemihydrate or anhydrite. Owing to the selection of the composition of the treatment solution, the temperature, the flow and owing to the method of application, the process can be inserted for employment in the manufacture of phosphoric acid by any one of the known methods, with markedly improved yield.

With regard to the known methods, the process further affords the advantage of enabling the mixing of weak phosphoric acid with the concentrated sulphuric acid outside of the reaction zone. Effectively, in the process, the mixing is achieved during the preparation of the treating solution and the calories released by the dilution of the sulphuric acid contribute to the concentration of the phosphoric acid, further to lend to the economy of the process, or such excess heat may be eliminated without the difficulties which are usually encountered in the cooling of the attack vats, particularly when such vats are of those which have large capacity.

Other advantages will appear in the above mentioned examples of application, given by way of illustration and not by way of limitation.

EXAMPLE 1

A continuous preparation of phosphoric acid is achieved with an attack stage of ore in a separate vat fitted with an agitator which provides a slurry of phosphoric acid containing a suspension of gypsum. Morocco 75 phosphate is treated and there is produced an acid having a concentration of 32% $P_2O_5$ and gypsum which is treated in order to obtain hemihydrate. Use is made of a series of treating solutions the $H_2SO_4$ content of which varies from 50% to 80% and the temperature between 50° C. and 120° C.

In 12 trials, a yield is obtained by solubilization of between 99.5% and 99.8%, a yield in washing of between 99.4% and 99.9%, and a total yield of between 99.0% and 99.7%.

EXAMPLE 2

(A) The process is applied to the preparation of phosphoric acid by the standard method giving gypsum and phosphoric acid having 33–34% of $P_2O_5$. Immediately after having collected the production acid, a dehydrating treatment solution bearing the gypsum cake is processed on the filter in 1 to 2 passages, afterwards the partially dehydrated cake is washed with water at the acid temperature. The following undermentioned table gives the average results of series of tests a, b, c and d, as identified in the table.

TABLE

| | Treating solution | | Number of passages | Total yield, percent |
|---|---|---|---|---|
| | $H_2SO_4$ percent weight | Temperature, °C. | | |
| a | 50–60 | 90–100 | 1.5 | 99 |
| b | 55–75 | 80–50 | 1.0 | 98.5–99 |
| c | 55–75 | 80–50 | 2 | 99.5 |
| d | (1) | (1) | 0 | 96–97 |

1 Without treatment.

It can be seen that in a and b there are obtained yields of the order of 99% with dehydrating solutions yielding a cake partially dehydrated but keeping nevertheless efficient qualities of filtration and washing. In c, the dehydration is more complete and the yield is still improved. By way of comparison, operation d is without treating the cake, but by washing it only according to the conventional technique and the yield obtained is only from 96% to 97%.

(B) The process of this invention is applicable to a continuous preparation of a high concentrated phosphoric acid by the usual dihydrate process.

At first treatment is made of gypsum coming from the attack of Togo phosphate and which, by the usual method, gives a 40% phosphoric acid with a yield of the order of 96%.

The gypsum cake is treated according to this invention by a dehydrating solution containing 65% of sulphuric acid at a temperature of 70° C. The total yield is then above 99%. The cake of dehydrated solid keeps its qualities for filtration, it is washed with water at the same temperature and it will be noticed that the qualities presented by the cake by washing are preserved.

EXAMPLE 3

The process of this invention is applied to a preparation of 50% phosphoric acid by the hemihydrate method. At the outlet of the attack vat there is obtained a slurry of hemihydrate which, after separation, is treated on the filter by a solution containing 80% of $H_2SO_4$ and at a temperature of 80° C. The anhydrite cake thus formed is filtered and washed with water at the temperature of the acid. The total yield is of 99.5%.

EXAMPLE 4

In a preparation of phosphoric acid having 50% of $P_2O_5$ by the hemihydrae method, such as in the preceding example, the formed solids are separated on a plane filter having a removable external wall. The solid is treated on the filter at 70° C. with a solution containing 200 g. of sulphuric acid per litre, and then it is subjected to a methodic washing with water at the same temperature and immediately the gypsum formed is removed by means of an helical screw. The total yield is of 99%.

According to an alternative embodiment, in the same preparation of phosphoric acid as in the preceding example, a fraction of the hemihydrate slurry is drawn off and sent to a centrifugal drier. After having collected the production acid, the solid is treated by the same hydrating solution as previously and then by washing with water while stirring it. The total yield reaches 99.2%.

We claim:

1. In a process for the preparation of phosphoric acid and calcium sulphate relatively free of syncrystallized phosphate, the steps of solubilizing calcium phosphate with a solution selected from the group consisting of sulphuric acid and a mixture of sulphuric acid and phosphoric acid to form calcium sulphate hemihydrate, calcium sulphate anhydrite or mixtures thereof, separating the calcium sulphate thus formed and the phosphoric acid, treating the separated calcium sulphate while still in the means for separation with a solution containing sulphuric acid in an amount within the range of 5–25% by weight and phosphoric acid in an amount within the range of 0–20% by weight, calculated as $P_2O_5$, to convert the hemihydrate to the dihydrate and the anhydrite to the hemihydrate and/or the dihydrate, separating the treated calcium sulphate and washing the separated calcium sulphate.

2. The process as claimed in claim 1 in which the treating solution is adjusted in temperature and concentration for each contact treatment with the separated calcium sulphate and in which the treating solution is recycled for use in the original attack on the calcium phosphate.

3. The process as claimed in claim 1 in which the treating solution is at a temperature within the range of 20–100° C. during treatment.

4. The process as claimed in claim 1 in which the calcium sulphate is separated from the phosphoric acid solution by centrifugal separation.

5. The process as claimed in claim 1 in which the contact time for treatment is within the range 15 seconds to 5 minutes.

6. The process as claimed in claim 1 which includes the introduction of seed crystals of calcium sulphate with the treating solution in an amount less than 10% by weight of reaction medium.

7. The process as claimed in claim 6 in which the seed crystals have the same state of hydration as that to which the calcium sulphate is to be converted.

8. In a process for the preparation of phosphoric acid and calcium sulphate relatively free of syncrystallized phosphate, the steps of solubilizing calcium phosphate with a solution selected from the group consisting of sulphuric acid and a mixture of sulphuric acid and phosphoric acid to form calcium sulphate hemihydrate, calcium sulphate dihydrate or mixtures thereof, treating the separated calcium sulphate while still in the means for separation with a solution containing sulphuric acid in an amount within the range of 50–98% by weight and phosphoric acid in an amount within the range of 0–35% by weight, calculated as $P_2O_5$, to convert the hemihydrate to the anhydrite and the dihydrate to the hemihydrate and/or the anhydrite, separating the treated calcium sulphate and washing the separated calcium sulphate.

9. The process as claimed in claim 8 wherein the calcium sulphate is in the form of the dihydrate and is converted to the hemihydrate with a treating solution containing sulphuric acid in an amount within the range of 25–80% $H_2SO_4$ and phosphoric acid in an amount within the range of 0–30% $P_2O_5$ at a temperature within the range fo 20–80° C.

10. The process as claimed in claim 8 in which the treating solution is adjusted in temperature and concentration for each contact treatment with the separated calcium sulphate and in which the treating solution is recycled for use in the original attack on the calcium phosphate.

11. The process as claimed in claim 8 in which the calcium sulphate is separated from the phosphoric acid solution by centrifugal separation.

12. The process as claimed in claim 8 in which the contact time for treatment is within the range of 15 seconds to 5 minutes.

13. The process as claimed in claim 8 which includes the introduction of seed crystals of calcium sulphate with the treating solution in an amount less than 10% by weight of reaction medium.

14. The process as claimed in claim 8 in which the treating solution is at a temperature within the range of 20° C. to the boiling point temperature.

References Cited

UNITED STATES PATENTS

| | | | |
|---|---|---|---|
| 3,472,619 | 10/1969 | Chelminski et al. | 23—122 |
| 3,505,013 | 4/1970 | Anaki et al. | 23—122 |
| 3,416,887 | 12/1968 | Natsubara et al. | 23—122 |
| 3,523,754 | 8/1970 | Yasutako et al. | 23—165 |

FOREIGN PATENTS

| | | | |
|---|---|---|---|
| 1,162,514 | 8/1969 | Great Britain | 23—165 |
| 1,485,940 | 5/1967 | France | 23—165 |

OSCAR R. VERTIZ, Primary Examiner

G. A. HELLER, Assistant Examiner

U.S. Cl. X.R.

423—167, 320